United States Patent [19]

Baitz et al.

[11] Patent Number: 5,387,980
[45] Date of Patent: Feb. 7, 1995

[54] DEVICE FOR SENDING AND RECEIVING GRAPHICAL DOCUMENTS VIA TELETETRANSMISSION LINES

[75] Inventors: Guenter Baitz, Berlin; Joachim Burchart, Schlangen; Wolfgang Malke, Berlin, all of Germany

[73] Assignee: Siemens Nixdorf Informationssysteme AG, Paderborn, Germany

[21] Appl. No.: 720,784

[22] Filed: Sep. 3, 1991

[30] Foreign Application Priority Data

Nov. 3, 1989 [DE] Germany ............... 3936684

[51] Int. Cl.⁶ .................. H04N 1/00; H04N 1/04
[52] U.S. Cl. .................. 358/400; 358/498; 358/476
[58] Field of Search ............... 358/400, 401, 408, 474, 358/494, 496, 497, 498, 296; 361/380, 390, 391; 346/145; 355/308, 309; 271/225

[56] References Cited

U.S. PATENT DOCUMENTS

| | | | |
|---|---|---|---|
| 4,005,257 | 1/1977 | Krallinger et al. | 358/476 |
| 4,266,251 | 5/1981 | Hara et al. | 358/476 |
| 5,055,946 | 10/1991 | Kurahashi et al. | 358/498 |
| 5,140,438 | 8/1992 | Kurahashi et al. | 358/401 |
| 5,166,812 | 11/1992 | Dow et al. | 358/400 |

FOREIGN PATENT DOCUMENTS

| | | |
|---|---|---|
| 3513518A1 | 10/1986 | Germany . |
| 4004418A1 | 8/1990 | Germany . |
| 58-142664 | 8/1983 | Japan ......................... 358/476 |
| 2128438A | 4/1984 | United Kingdom . |
| 2217261A | 10/1989 | United Kingdom . |

Primary Examiner—Edward L. Coles, Sr.
Assistant Examiner—Thomas D. Lee
Attorney, Agent, or Firm—Varnum, Riddering, Schmidt & Howlett

[57] ABSTRACT

A device for sending and receiving graphical documents via teletransmission lines comprises an input station (16), a withdrawal station (20) for single-sheet graphical original, a transport system which transports the graphical originals along a reading device from the input station (16) to the withdrawal station (20), an output station (32) for a printed print carrier and a transport system which transports the print carrier material from material supply station (60) along a printer to the output station (32). The output station (32) is located in the head region and the withdrawal station (20) in the base region of the device. Both the input station (16) and the withdrawal station (20) for the printed originals in the base region (8) of the device (2) are arranged on two opposite sides (3,6) or the device so that the output station (32) in the head region (10) of the device (2) is located at a considerable distance from both the input station (16) and the withdrawal station (20). It is therefore impossible to mistake printed documents output with graphical originals.

10 Claims, 4 Drawing Sheets

DEVICE FOR SENDING AND RECEIVING GRAPHICAL DOCUMENTS VIA TELETETRANSMISSION LINES

BACKGROUND OF THE INVENTION

1. Field of the Invention

The invention relates to apparatus for sending and receiving documents via telecommunication transmission lines and more particularly to such apparatus having a document input station, a document withdrawal station, and a document output station.

2. Prior Art

Devices for sending and receiving graphical representations via transmission lines are well known and are used, for example, in providing facsimile services using the telephone transmission network. Certain known facsimile transmission devices also have the capability of providing a reprint of a graphical document.

In most conventional facsimile devices the input station for the image originals and the output station for the print images lie so close together that output print images and input image originals cannot be kept clearly separate from one another. Especially when the device is used in the earlier described manner as general-purpose apparatus for the telecopying, copying, and printing, it is therefore essential that confusion of image originals with print images be largely excluded. There are known devices having an input station for image originals, a withdrawal station for these image originals, and an output station for the print images, in which the withdrawal station is arranged in the base region of the device; the input station for the image originals and the output station for the print images, however, are both arranged in the head region of the device, so that the above-described possibilities of confusion exist.

SUMMARY OF THE INVENTION

These and other problems of the prior art are overcome in accordance with this invention by a facsimile device wherein both the input station and the withdrawal station for the image originals are disposed in the base region of the device.

According to the invention it is provided, therefore, that in a device of the specified type the input station for the image originals is likewise arranged essentially in the base region of the device on an apparatus side away from the withdrawal station, so that the output station for the print images is located still alone in the head region of the device. In this manner the output print images, on the one hand, and the input image originals are always faultlessly separate from one another, so that confusion is largely precluded.

Advantageously, this arrangement makes possible an especially ergonomic device, since, for example, the successive input of several print originals, on the one hand, and their withdrawal, on the other hand, takes place on two sides of the apparatus facing away from one another, which accommodates the natural arm position. On the other hand, output print images are clearly outside the path of the image originals in the head region of the device, preferably on the top of the apparatus, so that any confusion or any erroneously interchanging of image originals and print originals are excluded.

According to a further development of the invention it is provided that the device has a substantially rectangular ground plan, and that the head region, at least on the apparatus side presenting the input station, recedes with respect to the base region in the manner of a step, the upper side of this step forming a supporting surface for the image originals. This arrangement facilitates the handling of the device, since the image originals do not have to be introduced into a receiving opening, but can be laid on the supporting surface. In the copying of individual sheets, these are drawn off from the supporting surface and transported along the reading device to the withdrawal station.

In order to be able to copy and telecopy books or the like, which cannot be transported through the device, it is further provided according to the invention, that the supporting surface of the step consists of a transparent material and that the reading device can be conveyed underneath this support surface by means of a conveyance drive. In this manner also the particular open pages of a book or the like can be received by the reading device.

In further development of the invention the step is at least partly constructed as a module movably arranged on the apparatus, which can occupy a first operating position integrated into the step and a second operating position withdrawn from the step. In the first operating position the device is set up for the processing of single-sheet image originals, in which the reading device stands in fixed position and the image original is moved along the reading device; in the second operating position the device is set for the copying of books or the like, in which case the image original lies immovable on the support surface and the reading device is moved underneath the support surface.

In order to transport single-sheet image originals through the device, there is provided a first transport system which grips the image originals at the input station and conveys them substantially in a straight line along the fixed reading device through the apparatus to the withdrawal station. A second transport system serves for transporting sheet material from at least one paper supply station arranged inside the device along the printer to the output station.

In substantially all conventional telecopying devices, for each outgoing transmission there is printed out a so-called sending protocol, which is likewise issued at the output station for the print images. The operator then has the assignment to seek out the sending protocol from other output print images and allocating it to the right image originals. In order to facilitate this process it is provided according to the invention that the second transport system has a branch for the deflecting of the sheet material along the printer to the withdrawal station. Therewith the sending protocol can be branched off after the printing from the path leading to the output station where it meets the image originals to which it is allocated.

In one embodiment it is provided that a first paper supply station is provided with at least one cassette for the reception of individual sheets and/or a second paper supply station for the reception of a roll of paper at the outlet side of which there is arranged a cutting station and that in the presence of both paper supply stations the second transport system has a first inflow interval allocated to the first paper supply station, and a second inflow interval allocated to the second paper supply station, which both issue in front of the printer into a common transport path. This arrangement makes it possible according to choice to print single sheets, if, for example, forms or letterhead paper with firm imprint are to be used, or sections severed from the roll of paper.

In a further development of the invention it is provided that a third transport system is present for the transporting of sheet material from a separate paper supply station. This arrangement makes it possible to dispense with a branch in the second transport system through which the sending protocol is to be guided to the withdrawal station. Furthermore, there exists the possibility of using sheet material of less value for the drawing up of the sending protocol and a printer of lower quality, so that, as compared to the solution described further above, lower operating costs are to be expected.

BRIEF DESCRIPTION OF THE DRAWING

An illustrative embodiment of the invention is described below with reference to the drawing, wherein.

DETAILED DESCRIPTION

Figure 1:
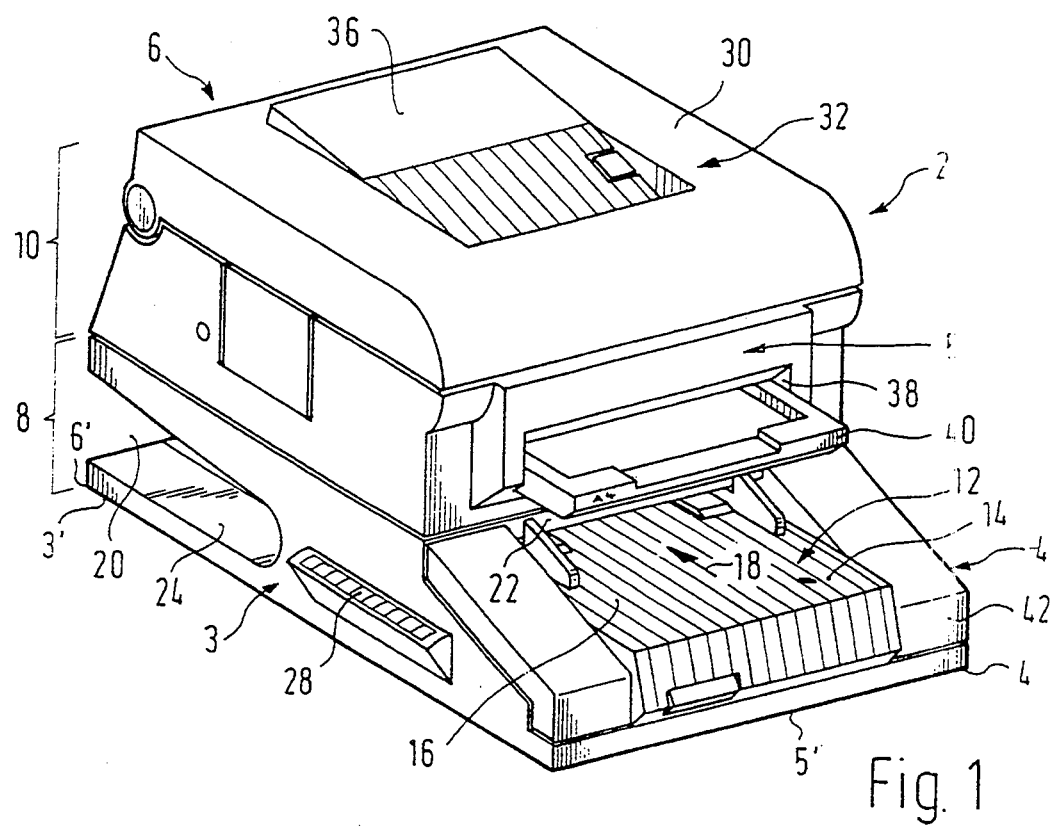
FIG. 1 is a frontal perspective view of a facsimile transmission device incorporating the principles of the invention.

The device 2 represented in FIG. 1 has a substantially rectangular ground plan. In order to facilitate the following specification, let the apparatus side allocated to the side 3' be designated as front side 3, the apparatus side allocated to the ground plan side 4' be designated as rear side 4 and the apparatus sides allocated to ground plan sides 5' and 6' be designated as right side 5 and left side 6, respectively.

The device is composed of a lower base region (8) and an upper head region 10. As FIG. 1 makes evident, the head region 10 recedes on the apparatus side 5 with respect to the base region 8 in the manner of a step, the upper side 12 of this step forming a depositing surface 14 for the image originals.

Figure 2:
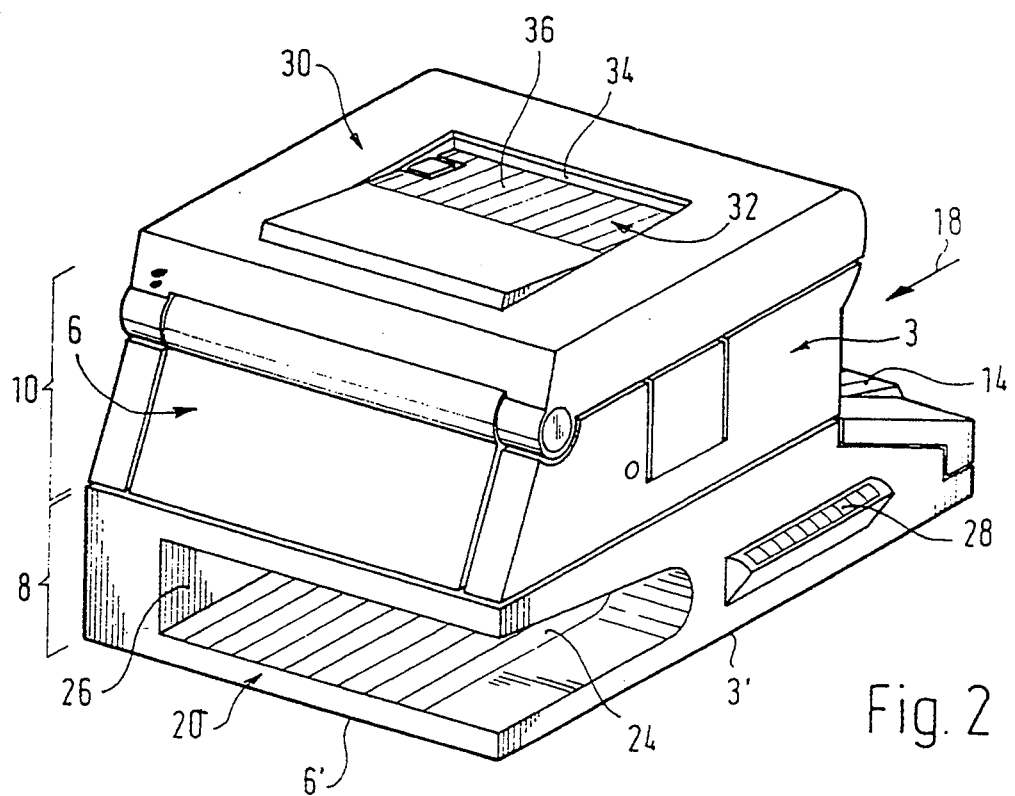
FIG. 2 if a rear perspective view of the device of FIG. 1.

The depositing surface 14 forms, accordingly, the input station 16 of the device. Single-sheet image originals laid in this input station 16 are conveyed in the transport direction marked by the arrow 18 along a reading device (not represented in FIG. 1) to the withdrawal station 20 present in the region of the left apparatus side 6, where they can be removed (see also FIGS. 4 and 5). The image originals enter the device through an input opening 22 which is formed on the end of the depositing surface 14 facing the device. The withdrawal station 20 has a withdrawal opening 24 directed at an angle of 90° to the transport direction 18 and a withdrawal opening 26 directed in transport direction 18 (see also FIG. 2).

On the front side 3 there is provided an operating and display field 28.

In the head region 10, and namely on its upper side 30, there is arranged the output station 32 for the print images. The print images leave the apparatus casing through an output opening 34 and are deposited on a depositing surface 36 set slightly obliquely with respect to the upper side 30, where they can be removed.

As shown especially in FIG. 1, above the input opening 22 there is formed a cassette opening 38, into which there can be thrust a cassette 40 containing a single-sheet paper material. The single sheets withdrawn from this cassette 40 are transported in a manner designated in detail with the aid of FIGS. 4 and 5 along a printer to the output station 32.

Figure 3:
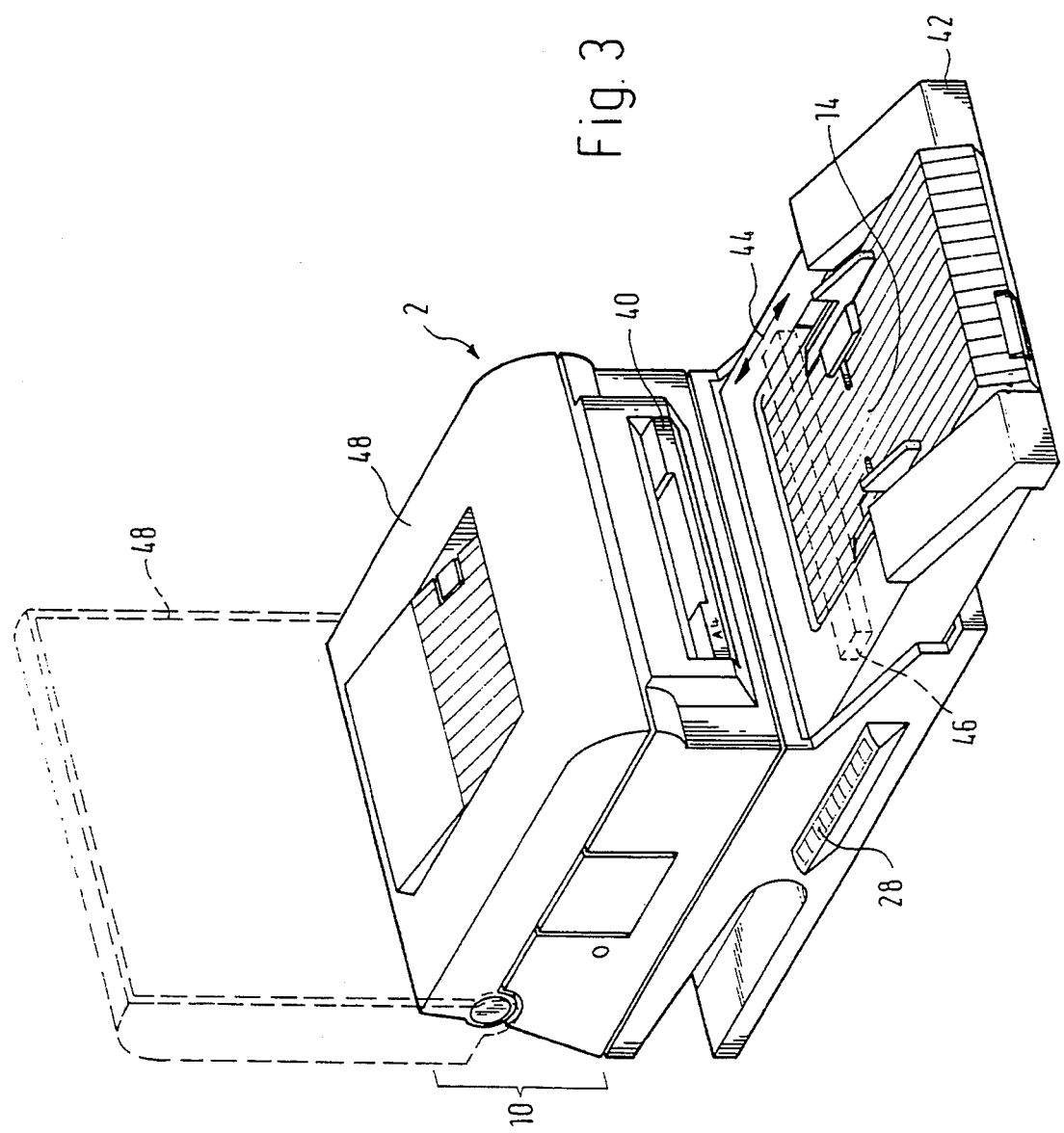
FIG. 3 is a perspective view of the device of FIG. 1 in a different operating configuration.

FIG. 3 shows the device according to FIG. 1 in another operating position. It is to be perceived that the input station 16 is constructed at least partly as a module 42 movably arranged on the device 2, which module can be drawn out of the first operating position represented in FIG. 1 into a second operating position represented in FIG. 3. Thereby a large region of the depositing surface 14 becomes accessible, onto which there can be transported larger and bulkier print originals, which cannot be transported through the device. For this case the depositing surface 14 is constructed of a transparent material, so that the print original can be scanned from below through the depositing surface 14. For this case there is provided in the device a reading device 46 movably borne in the direction of the arrow 44, which receives the print original resting on the depositing surface 14. The reading device can be a separate reading device which has only the function of receiving stationary reading devices; it may, however, also simultaneously have the function of receiving print originals transported through the device 2. In this case it is provided that the reading device 46 is arrested in fixed position in the apparatus in the first operating position represented in FIG. 1 of the module 42, in order to receive the print originals transported along this reading device. In the case of the second operating position of the module 42, represented in FIG. 3, the reading device 46 is automatically unlocked, so that it can execute its scanning movement in the direction of the arrow 44.

As shown especially in FIG. 3, for the covering of the upper side of the head part 10 there is provided a cover 48 which can be swung between a closed position represented with solid lines and an opening position represented with broken lines. When the cover 48 occupies its open position, components arranged in the apparatus for maintenance purposes, for the removal of a paper jam etc. become accessible; furthermore it is provided, that besides the single-sheet material arranged in the cassette 40, in a further paper supply station there is additionally arranged a roll of paper, and that the print-out can occur at will onto single-sheet material or material cut off from the roll, as is more precisely visible from FIG. 4.

Figure 4:
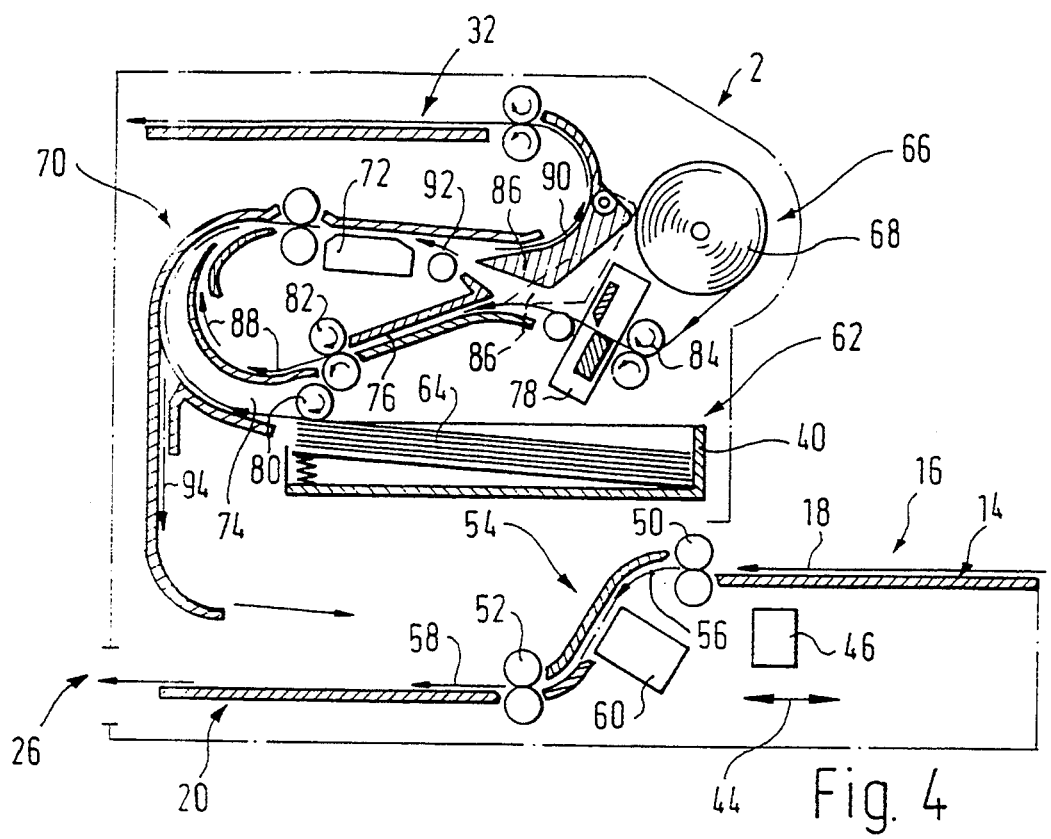
FIG. 4 is a schematic representation of the transport paths of image originals and print images in the device of FIG. 1.

FIG. 4 shows very schematically the device 2. The input station 16 consists essentially of the depositing surface 14, on which a single-sheet print original can be laid. This print original is grasped by the first transport system 54 consisting of interacting roll pairs 50, 52 and transported in the direction of the arrows 18, 56, 58, as the case may be, along the reading device (scanner) 60 to the withdrawal station 20. There it can be removed, for example, through the withdrawal opening 26.

In addition, analogously to FIG. 3, there is drawn a reading device 46 movable in the direction of the arrow 44, which can receive image originals stationarily resting on the depositing surface 14, in which case, then, the depositing surface 14 must consist of a transparent material. As already stated further above, instead of the two reading devices 46 and 60 there can be provided a single reading device, which can fulfill both functions.

The device 2 comprises a first paper supply station 62, which is formed by the cassette 40. This cassette 40 services for the reception of single sheets 64.

The device presents, furthermore, a second paper supply station 66, in which there can be arranged a paper roll 68. The second transport system 70, which transports the empty paper from one of the two paper supply stations 62 and 66 along the printer 72 to the output station 32, has a first inflow section 74, over which the single sheets 64 are transferred to the transport system 70; over a second inflow section 76 there are fed sheet sections coming from the paper roll 68, through a cutting arrangement 78 engaged in front of the inflow section 76 to the second transport system 70. The draw-off roll 80 allocated to the first paper supply station 62 or the transport roll pairs 82 and 84 allocated to the second paper supply station 66 can be driven at will.

To the second transport system 70 there is allocated a switch 86, which can be shifted between the first operating position represented with dot-and-dashed lines and the second operating position represented with continuous lines. As FIG. 4 directly makes evident, material drawn off from the paper roll 68 in the first operating position of the switch 86 in the sense of the arrow 88 is introduced into the second transport system 70 and, in correspondence to the arrow 90, to the output station 32. This type of operation holds for the production of print images. In the second operating position of the switch 86, represented with continuous lines, the sheet material is introduced in correspondence to the arrow 92 into the second transport system 70 and guided along the printer 72, in correspondence to the arrow 94, into the lower region of the device 2 and to the withdrawal station 20. This type of operation serves for the printing out of sending protocols, so that the sending protocol(s) are brought together in each case with the image originals to which they are allocated running through the device 2.

Figure 5:
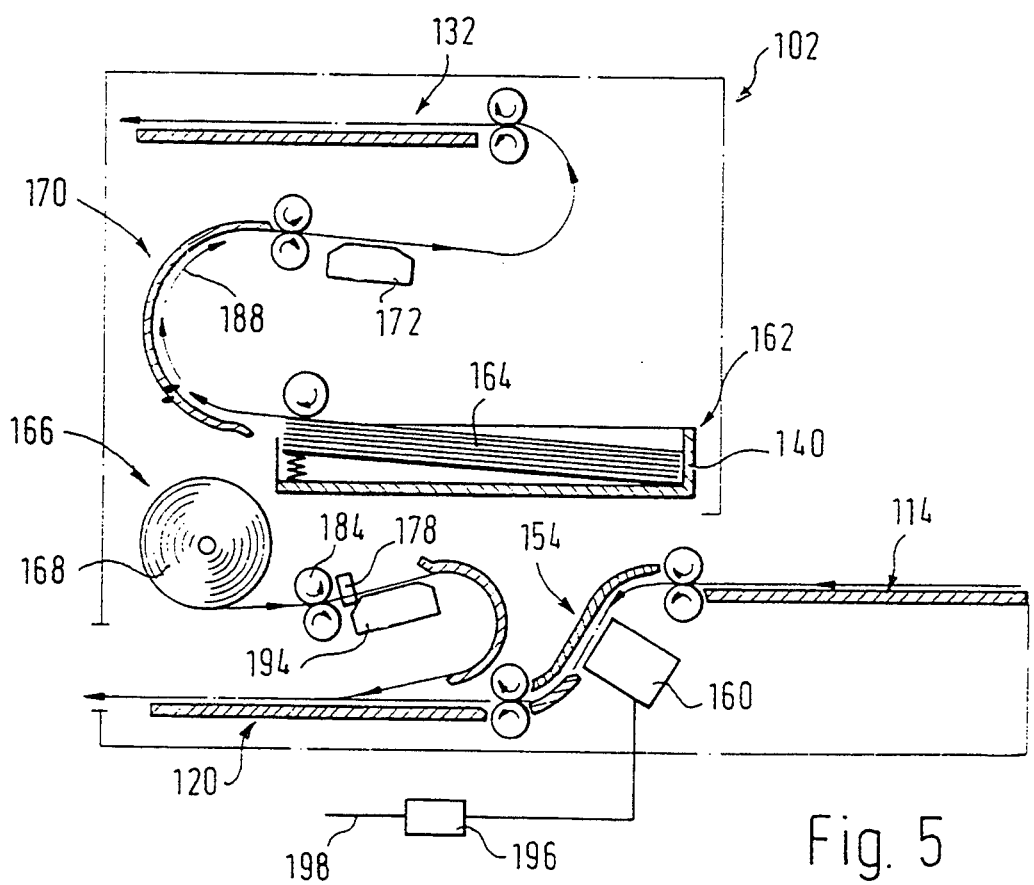
FIG. 5 is a schematic representation of another embodiment of the transport paths of FIG. 4.

FIG. 5 shows an example of execution different from that of FIG. 4 of a device 102. A first transport system 154 serves in an analogous manner for the transport of single-sheet originals deposited on the depositing surface 114 along the reading device 160 to the withdrawal station 120.

A first paper supply station 162 consists essentially of a cassette 140 for the reception of signal sheets 164. The single sheets 164 are fed by the second transport system 170 in the direction of the arrows 188 along the printer 172 to the output station 132.

A second paper supply station 166 is equipped with a paper roll 168, from which, over a third transport system 184, paper is drawn off and can be fed to the withdrawal station 120. The paper drawn off from the paper roll 168 is cut into sheet sections in a cutting station 178 and guided along a second printer 194. The paper drawn off from the paper roll 168 serves exclusively to make sending protocols available, so that the printer 194 can be a cheap printer with lower print quality. This arrangement, also, makes it possible to automatically assign the sending protocols to the image originals to which they are allocated.

As FIG. 5 makes evident, on outlet side of the reading device 160 there can be engaged an arrangement 196 which converts the image point signals of the high-resolution reading device 160 to a resolution norm usable for teletransmission; the image point signals of lower resolution thereby formed are fed over an output line 198 to the teletransmission network.

In use as a table copier, however, the high resolution of the reading device 160 is fed over connecting lines, here in the interest of perspicuity not represented, to the high-resolution printer 172, which generates a high-quality print image.

An arrangement corresponding to the arrangement 196 may also be engaged on the outlet side of the reading devices 60 and 76 represented in FIG. 4, which, in the interest of better perspicuity, again was not represented.

Figure 6:
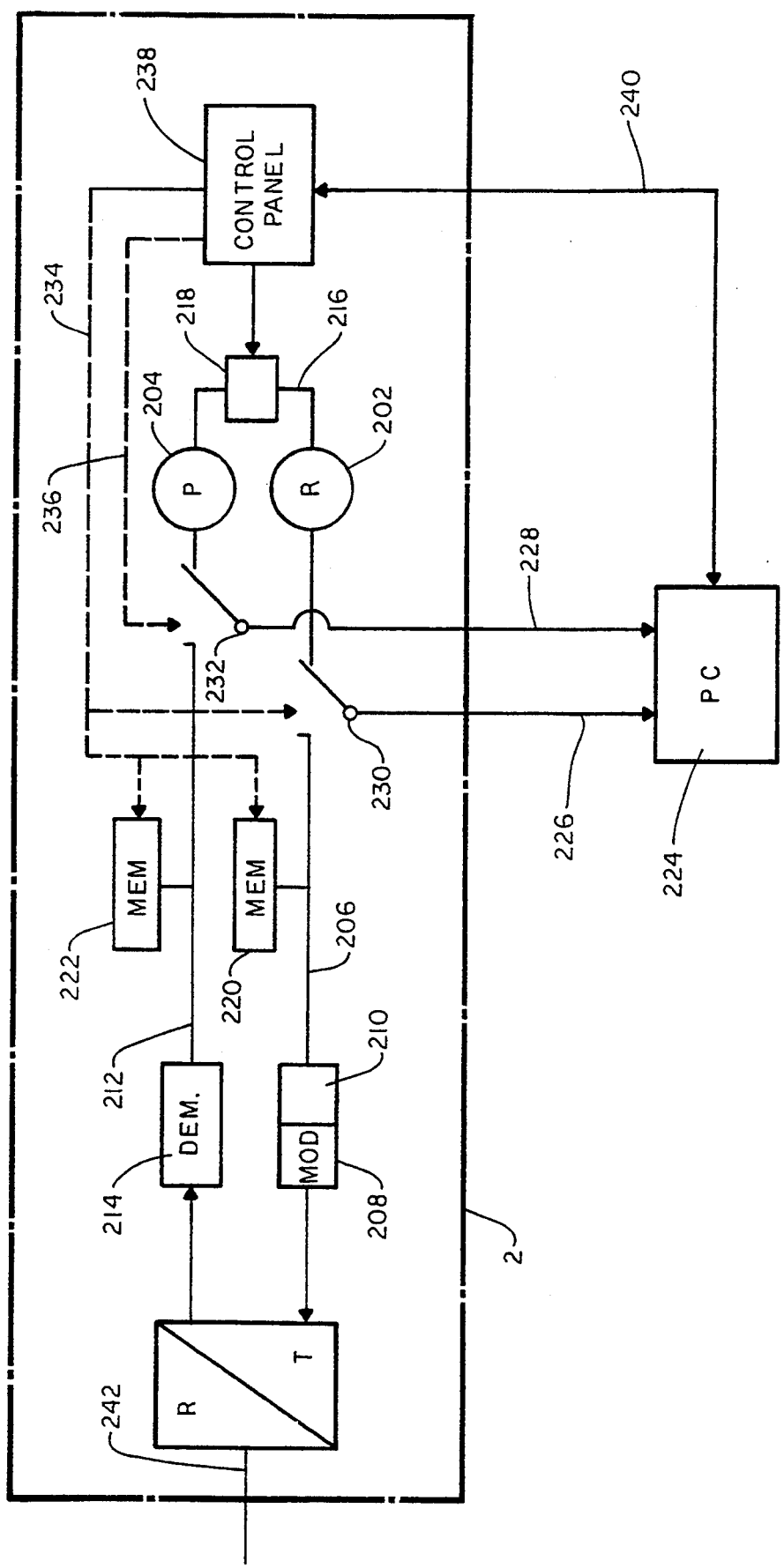
FIG. 6 is a block diagram representation of circuitry of the device of FIG. 1.

FIG. 6 shows a block circuit diagram for an apparatus according to FIG. 1. The apparatus is again designated as a whole with 2. It has a reading device 202 and a printer 204. The reading arrangement is connected over a line 206 with modulator arrangement 208, which transforms the image point signals received from the reading device 202 in a manner known per se into signals usable for the transmitter T. To the modulator 208 there is allocated a special arrangement 210, which transforms the high-value resolution norm of the reading device 202 into the resolution norm established for the teletransmission.

The printer 204 is connected over a line 212 with a demodulator 214. The demodulator transforms the signals coming from the receiver R into signals usable for the printer 204.

The reading device 202 and the printer 204 are directly connected with one another over a line 216, in the line 216 there is arranged a device 218 which transforms the image point signals proceeding from the reading device into image point signals usable for the printer, without in the process changing the high resolution quality of the reading device 202. Thereby the device 2 can produce copies of high quality, so that it is usable as an office copier.

To the line 206 there is allocated a first memory 220 in which data transferred over this line 206 can be stored. Correspondingly, to the line 212 there is allocated a memory 222, in which data passing on the line 212 can be stored.

An external data processor installation, for example the PC 224, has two connecting lines 226, 228, the first of which is connectable with the line 206 over a switch 230 and the second of which is connectable over a switch 232 with the line 212.

The switches 230 and 232 are individually controllable over allocated control lines 234 and 236, respectively, from an apparatus control panel 238. The apparatus operating panel 238 can be connected over a further connecting line 240 with the PC 224.

The circuit represented makes it possible to send data set up in the PC directly over the lines 226 and the switch 230 into the line 206 and to the transmitter T. Likewise data arriving over the receiver via the line 212, the switch 232 and the line 228 can be loaded into the PC.

Further, there is given the possibility of feeding data received from the reading device 202 over the switch 230 and the line 226 into the PC. Over the line 228 and the switch 232 it is possible, furthermore, for the printer 204 to be driven directly by the PC.

The memory 220 makes it possible to store data coming from the PC 224 or from the reading device 202, while simultaneously receiving data over the receiver R; when the teletransmission line 242 from the receiver/sender unit is again free, the data from the memory 220 can be transmitted over the transmitter 5. On the other hand, data arriving in the receiver during a sending operation can be stored in the memory 222 if the printer 204 is occupied by an internal copying process; after the printer 204 becomes free the data deposited in the memory 222, can then be printed out by the printer 204.

We claim:

1. Apparatus for sending and receiving graphic images via transmission lines, having opposing sides, a base region and a head region the apparatus comprising:
    a reading device;
    an input station and a withdrawal station for a single-sheet image original;
    a first transportation system for transporting a single-sheet image original from the input station to the withdrawal station along the reading device;
    a material supply station for storing printed carrier material;
    a printer;
    an output station for a printed print carrier; and
    a second transport system for transporting print carrier material from the supply station to the output station along the printer;
    the input station and withdrawal station being disposed in the base region and on opposing sides of the apparatus and the output station being disposed in the head region of the apparatus;
    the apparatus having a substantially rectangular ground plan and the head region receding in a steplike fashion in relation to the base region to expose a part of the base region having an upper side forming a depositing surface of the input station for depositing image originals;
    the input station constructed at least in part as a module movably arranged to occupy a first operating position substantially within the ground plan and a second operating position extending beyond the ground plan in at least one direction, the depositing surface comprising a transparent material, and wherein the reading device is movably disposed underneath the depositing surface.

2. The apparatus in accordance with claim 1 wherein the apparatus has an upper side and the output station is located on the upper side of the apparatus.

3. The apparatus in accordance with claim 1 and further comprising a fixed reading device and wherein the fixed reading device is activated in the first operating position and the movable reading device is activated in the second operating position.

4. The apparatus in accordance with claim 1 wherein the reading device is retained in a fixed position in the first operating position and is movably disposed under the depositing surface in the second operating position.

5. The apparatus in accordance with claim 1 wherein the apparatus of the left and right sides.

6. The apparatus in accordance with claim 5 wherein an image original is transported by the first transport system in a predetermined direction and wherein the withdrawal opening comprises a section which is open in a direction extending perpendicular to the predetermined direction.

7. The apparatus in accordance with claim 6 wherein the withdrawal opening further comprises a section which is open in a direction extending parallel to the predetermined direction.

8. The apparatus in accordance with claim 1 wherein the material supply station comprises a loading opening for the withdrawal and introduction of a cassette.

9. Apparatus for sending and receiving graphic images via transmission lines, having opposing sides, a base region and ahead region, the apparatus comprising:
    a reading device;
    an input station and a withdrawal station for a single-sheet image original;
    a first transportation system for transporting a single-sheet image original from the input station to the withdrawal station along the reading device;
    a material supply station for storing printed carrier material;
    a printer;
    an output station for a printed print carrier; and
    a second transport system for transporting print carrier material from the supply station to the output station along the printer;
    the input station and withdrawal station being disposed in the base region and on opposing sides of the apparatus and the output station being disposed in the head region of the apparatus; and
    a paper supply station, a second printer and a third transport system, the third transport system for transporting sheet material from the paper supply station along the second printer to the withdrawal station.

10. Apparatus for sending and receiving graphic images via transmission lines, having opposing sides, a base region and a head region, the apparatus comprising:
    a reading device;
    an input station and a withdrawal station for a single-sheet image original;
    a first transportation system for transporting a single-sheet image original from the input station to the withdrawal station along the reading device;
    a material supply station for storing printed carrier material;
    a printer.;
    an output station for a printed print carrier; and
    a second transport system for transporting print carrier material from the supply station to the output station along the printer;
    the input station and withdrawal station being disposed in the base region and on opposing sides of the apparatus and the output station being disposed in the head region of the apparatus;
    the apparatus comprising a front side, a rear side, a left side and a right side and the input station comprising an input opening in one of the left and right sides and the withdrawal station comprising a first opening in the other of the left and right sides a second opening extending in a direction perpendicular to the first opening.

* * * * *